(12) United States Patent
Gao

(10) Patent No.: US 11,389,848 B2
(45) Date of Patent: Jul. 19, 2022

(54) FLATTENING DEVICE, CONVEYING APPARATUS AND PROCESSING SYSTEM

(71) Applicant: DALIAN FIELD HEAVY-MACHINERY MANUFACTURING CO., LTD, Liaoning (CN)

(72) Inventor: Guowu Gao, Liaoning (CN)

(73) Assignee: DALIAN FIELD HEAVY-MACHINERY MANUFACTURING CO., LTD, Dalian (CN)

( * ) Notice: Subject to any disclaimer, the term of this patent is extended or adjusted under 35 U.S.C. 154(b) by 0 days.

(21) Appl. No.: 16/973,785

(22) PCT Filed: Jun. 6, 2019

(86) PCT No.: PCT/CN2019/090399
§ 371 (c)(1),
(2) Date: Dec. 10, 2020

(87) PCT Pub. No.: WO2019/237994
PCT Pub. Date: Dec. 19, 2019

(65) Prior Publication Data
US 2021/0245219 A1 Aug. 12, 2021

(30) Foreign Application Priority Data
Jun. 12, 2018 (CN) .......................... 201810599465.1

(51) Int. Cl.
*B21D 1/06* (2006.01)
*B21D 43/00* (2006.01)
(Continued)

(52) U.S. Cl.
CPC ............. *B21D 1/06* (2013.01); *B21D 43/006* (2013.01); *B21D 43/023* (2013.01); *B21D 43/28* (2013.01)

(58) Field of Classification Search
CPC ..................................... B21D 1/02; B21D 1/06
(Continued)

(56) References Cited

U.S. PATENT DOCUMENTS 1,751,094 A * 3/1930 Matteson ................ B21F 1/023
72/40
3,818,739 A * 6/1974 Munchbach ............. B21D 1/02
72/163

(Continued)

FOREIGN PATENT DOCUMENTS

CN 202015761 U 10/2011
CN 203109039 U 8/2013
(Continued)

OTHER PUBLICATIONS

The First Office Action for Russia Application No. 2020143081, dated Jun. 23, 2021, 20 pages.
(Continued)

*Primary Examiner* — Shelley M Self
*Assistant Examiner* — Katie L. Parr
(74) *Attorney, Agent, or Firm* — Law Offices of Liaoteng Wang

(57) ABSTRACT

Disclosed is a flattening device, comprising: a rack; a material-pressing component, which is provided on the rack and has a material-pressing part; a material-guiding component, which is provided on the rack and has a material-guiding part corresponding to the material-pressing part, the material-pressing part and the material-guiding part being configured to be able to bear against two sides of a sheet material respectively, so as to form a flattening channel
(Continued)

between the material-guiding part and the material-pressing part; and an adjusting component, which drives at least one of the material-pressing component and the material-guiding component to move, so as to adjust the distance between the material-pressing part and the material-guiding part. Further disclosed are a material-conveying apparatus including the flattening device and a sheet material processing system comprising the material-conveying apparatus.

16 Claims, 11 Drawing Sheets

(51) Int. Cl.
  *B21D 43/02* (2006.01)
  *B21D 43/28* (2006.01)
(58) Field of Classification Search
  USPC .................................. 72/160, 162, 166, 169
  See application file for complete search history.

(56) References Cited

U.S. PATENT DOCUMENTS

| | | | | | |
|---|---|---|---|---|---|
| 4,635,458 | A | * | 1/1987 | Bradlee | .................... B21D 1/02 72/163 |
| 6,598,445 | B2 | * | 7/2003 | Mohring | ................... B21D 1/02 72/163 |
| 2008/0098784 | A1 | * | 5/2008 | Hartung | .................... B21D 1/02 72/160 |
| 2016/0354818 | A1 | * | 12/2016 | Cox, III | ................... B21B 37/16 |
| 2019/0184439 | A1 | * | 6/2019 | Martinello | ............. B21D 37/14 |

FOREIGN PATENT DOCUMENTS

| | | | | | |
|---|---|---|---|---|---|
| CN | 103894451 | A | | 7/2014 | |
| CN | 105436681 | A | * | 3/2016 | ............. B23D 15/06 |
| CN | 105750361 | A | * | 7/2016 | ............... B21D 1/02 |
| CN | 107913922 | A | * | 4/2018 | ............. B21D 43/02 |
| CN | 207464010 | U | | 6/2018 | |
| CN | 108672523 | A | | 10/2018 | |
| CN | 208483042 | U | | 2/2019 | |
| DE | 2117489 | A1 | | 10/1971 | |
| GB | 2062513 | A | * | 5/1981 | ............... B21D 1/02 |
| JP | 59076621 | A | * | 5/1984 | ............... B21D 1/02 |
| JP | 61038712 | A | * | 2/1986 | ............... B21D 1/05 |
| JP | 2002102925 | A | | 4/2002 | |
| JP | 2005066469 | A | | 3/2005 | |
| KR | 20170021506 | A | | 2/2017 | |
| RU | 2041754 | C1 | | 8/1995 | |
| RU | 2201826 | 02 | | 4/2003 | |
| RU | 2201826 | C2 | | 4/2003 | |
| RU | 2346773 | C2 | | 2/2009 | |
| RU | 2365445 | C1 | | 8/2009 | |
| SU | 1378977 | A1 | | 3/1988 | |

OTHER PUBLICATIONS

PCT International Search Report for PCT/CN2019/090399, dated Sep. 11, 2019, 14 pages.
The first Office Action for Russian Application No. 2020143081, dated Jun. 23, 2021, 19 pages.

* cited by examiner

US 11,389,848 B2

FLATTENING DEVICE, CONVEYING APPARATUS AND PROCESSING SYSTEM

CROSS REFERENCE TO RELATED APPLICATIONS

The present application is a National Phase of PCT Application No. PCT/CN2019/090399 filed on Jun. 6, 2019, which claims priority to Chinese Patent Application No. 201810599465.1, filed on Jun. 12, 2018 and titled "FLATTENING DEVICE, CONVEYING APPARATUS AND PROCESSING SYSTEM", both of which are incorporated herein by reference in their entireties.

TECHNICAL FIELD

The present application relates to a technical field of devices for processing materials, and particularly relates to a flattening device, a conveying apparatus and a processing system.

BACKGROUND

A production line for processing a sheet material (such as a steel strap, and a plate) needs to maintain continuous conveying of the sheet material. Meanwhile, it is necessary to convey the sheet material to the production line in a timely and rapid manner so that the sheet material enters the next processing procedure. At present, the existing high-speed production lines with sheet feeding function on the market usually actively feeds the sheet material in a manual traction manner, so as to complete the feeding procedure of the production line. In such manner, the feeding of the material is slow, and the feeding operation is complicated and difficult, a waste of manpower and material resources are brought to some extent and thus the production efficiency of the entire production line is reduced. In view of this, the existing sheet material feeding equipment cannot meet the technical needs of the modern high-speed production line any more.

SUMMARY

The embodiments of the present application provide a flattening device for sheet material, which can feed material to the production line continuously and rapidly, can adapt to the high-speed production line and meet the material feeding requirements of the high-speed production line. The flattening device of the embodiments feeds material accurately and rapidly, and the feeding process is simple to operate, which saves manpower and material resources, and improves the production efficiency of the entire production line.

One aspect of the embodiments of the present application provides a flattening device for sheet material, including: a machine framing; a material pressing component, disposed on the machine framing and including a material pressing portion; a material guiding component, disposed on the machine framing and including a material guiding portion corresponding to the material pressing portion, the material pressing portion and the material guiding portion being arranged to be able to abut against two sides of the sheet material respectively and form a flattening channel between the material guiding portion and the material pressing portion; and an adjustment component, adapted to drive at least one of the material pressing component and the material guiding component to move, so as to adjust a distance between the material guiding portion and the material pressing portion.

According to one aspect of the embodiments of the present application, wherein the material guiding portion and the material pressing portion are formed into arc surfaces with shapes adapted to each other.

According to one aspect of the embodiments of the present application, wherein two ends of the material guiding portion in an extending direction of the flattening channel are formed to have flat surfaces.

According to one aspect of the embodiments of the present application, wherein at least one of the material guiding portion and the material pressing portion includes a plurality of rotating components arranged in an extending direction of the flattening channel.

According to one aspect of the embodiments of the present application, wherein each of the plurality of rotating components is formed in a cylindrical shape, and rotation axes of the plurality of rotating components are parallel to each other.

According to one aspect of the embodiments of the present application, wherein the adjustment component includes a guiding member, and the material pressing component is movably disposed on the machine framing via the guiding member so that the material pressing portion is able to vertically move close to or away from the material guiding portion.

According to one aspect of the embodiments of the present application, the flattening device further includes a moving component adapted to drive the material guiding component to move so that the material guiding portion and the material pressing portion are transversally aligned or staggered.

According to one aspect of the embodiments of the present application, wherein the material guiding component includes a cutting end extending toward an entrance of the flattening channel, and the cutting end extends beyond an end of the material pressing component located at the entrance of the flattening channel.

According to one aspect of the embodiments of the present application, wherein the material guiding component includes a guiding end extending toward an exit of the flattening channel, and the guiding end extends beyond an end of the material pressing component located at the exit of the flattening channel.

According to one aspect of the embodiments of the present application, wherein the flattening device includes two material pressing components vertically disposed on two sides of the material guiding component.

Another aspect of the embodiments of the present application provides a conveying apparatus for conveying sheet material, including: the flattening device according to the above embodiments; and a material guiding device, disposed downstream of the flattening device so that the sheet material enters the material guiding device by means of the flattening channel of the flattening device.

According to another aspect of the embodiments of the present application, wherein the machine framing of the flattening device is integrally formed or detachably connected with the material guiding device.

According to another aspect of the embodiments of the present application, the conveying apparatus further includes a first guide rail, the material guiding device is movably disposed on the first guide rail, and is able to move in a first horizontal direction on the first guide rail so as to move the flattening device close to or away from the sheet material.

According to another aspect of the embodiments of the present application, the conveying apparatus further includes a second guide rail movably disposed on the first guide rail, and the material guiding device is movably connected to the second guide rail, and is able to move in a second horizontal direction on the second guide rail, wherein the first horizontal direction is perpendicular to the second horizontal direction.

A further aspect of the embodiments of the present application provides a processing system for processing sheet material, wherein the processing system includes the conveying apparatus according to above embodiments.

BRIEF DESCRIPTION OF THE DRAWINGS

The features, advantages and technical effects of exemplary embodiments of the present application will be described below with reference to the accompanying drawings.

The accompanying drawings are not drawn to actual scale.

DETAILED DESCRIPTION

The implementations of the present application are further described in detail with reference to the accompanying drawings and embodiments. The following detailed description of the embodiments and the accompanying drawings are used to exemplarily illustrate the principle of the present application, but are not intended to limit the scope of the present application, that is, the present application is not limited to the described embodiments.

In the description of the present application, it should be noted that, unless otherwise specified, "several" means more than one; "multiple" means two or more; the orientation or positional relationship indicated by the terms "upper", "lower", "inner", "outer", "vertical", "horizontal", etc., are only for the convenience of describing the present application and simplifying the description, and do not indicate or imply that the device or element referred to must have the specific orientation or be constructed and operated in the specific orientation, and thus cannot be understood as a limitation of the present application. In addition, the terms "first", "second", etc. are only used for descriptive purposes, and cannot be understood as indicating or implying relative importance. In the description of the present application, it should further be noted that, unless otherwise clearly defined and limited, the terms "install" and "connect" should be understood in a broad sense, and for the person skilled in the art, the specific meaning of the above terms in the present application can be understood according to specific conditions.

The flattening device provided by the embodiments of the present application can guide a sheet material 98 (for example, a steel strip or a steel plate) into the next processing procedure, and can reshape the sheet material 98. After the sheet material 98 is feed into the flattening device, the sheet material 98 will move toward the next processing procedure under the guidance of the flattening device. The flattening device of the present embodiment can feed material to the production line rapidly and continuously, and thus can adapt to a high-speed production line and meet the feeding requirements of the high-speed production line. The flattening device of the present embodiment feeds the material accurately and rapidly, the feeding process is simple to operate, which saves manpower and material resources and also improves the production efficiency of the entire production line.

Figure 1:
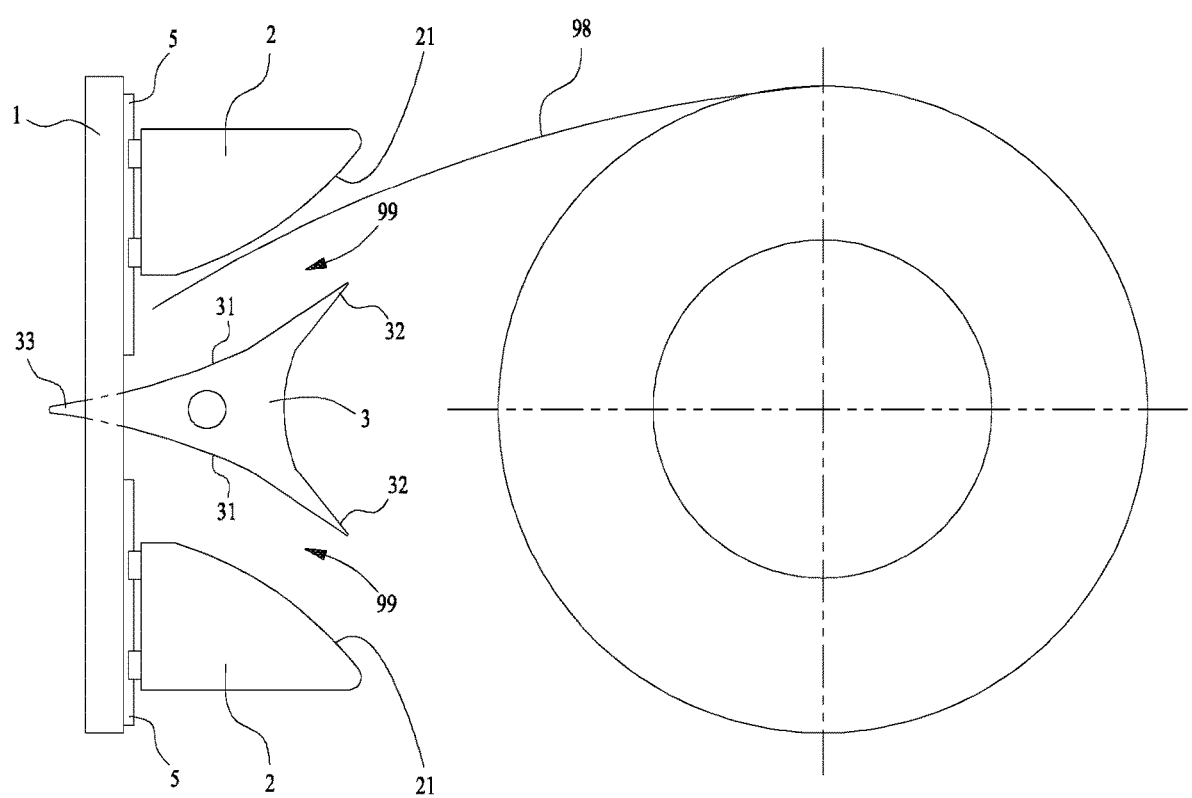
FIG. 1 is a schematic diagram of a flattening device according to an embodiment of the present application in a use state.

FIG. 1 schematically shows an embodiment of the flattening device in a use state. As shown in FIG. 1, the flattening device of the embodiment of the present application is adapted to guide and reshape the sheet material 98, and includes a machine framing 1, a material pressing component 2, a material guiding component 3, and an adjustment component. The material pressing component 2 is disposed on the machine framing 1 and includes a material pressing portion 21. The material guiding component 3 is disposed on the machine framing 1 and includes a material guiding portion 31 corresponding to the material pressing portion 21. The material pressing portion 21 and the material guiding portion 31 are arranged to be able to abut against two sides of the sheet material 98 respectively and form a flattening channel 99 between the material guiding portion 31 and the material pressing portion 21. The adjustment component is adapted to drive at least one of the material pressing component 2 and the material guiding component 3 to move so as to adjust a distance between the material guiding portion 31 and the material pressing portion 21, thereby adjusting the width of the flattening channel 99.

The flattening device of the present embodiment is connected and fixed to an installation platform (for example, ground or other device) by means of the machine framing 1. The machine framing 1 supports the overall weight of the flattening device. The flattening channel 99 formed by the material pressing portion 21 and the material guiding portion 31 is a channel for guiding the sheet material 98 to move directionally and limiting the sheet material 98 in position. After the sheet material 98 enters the flattening channel 99, the sheet material 98 can move in an extending direction of the flattening channel 99 under an action of an external force to accurately arrive at a processing station of the next procedure. The material pressing portion 21 and the material guiding portion 31 are adapted to restrict and limit the sheet material 98 entering the flattening channel 99 in position. Under the action of the adjustment component, the distance between the material pressing portion 21 and the material guiding portion 31 can be adjusted, so as to adjust the size of the flattening channel 99 and thus change the width of the flattening channel 99. As such, on the one hand, the flattening device can be adapted to guide sheet materials 98 of different thicknesses, and thus the adaptability of the flattening device is improved. On the other hand, when the size of the flattening channel 99 is adjusted to be greater, the sheet material 98 can be inserted into the flattening channel 99 easily, and after the sheet material 98 abuts on the material pressing portion 21 and is restricted by the material pressing portion 21, the distance between the material pressing portion 21 and the material guiding portion 31 can be adjusted again to adjust the size of the flattening channel 99 to an appropriate value and form an effective restriction on the sheet material 98; thus, the convenience of loading the sheet material 98 into the flattening device is improved, the difficulty of loading the sheet material 98 is lowered, and the operating efficiently of loading the sheet material 98 is improved.

In a preferred embodiment, the adjustment component drives the material pressing component 2 to move, so as to move the material pressing portion 21 of the material pressing component 2 close to or away from the material guiding portion 31 of the material guiding component 3, and thus adjust the distance between the material pressing portion 21 and the material guiding portion 31. As such, after a position calibration of the material guiding component 3 is completed, only the position of the material pressing component 2 needs to be adjusted in the following procedures, and there is no need to adjust the position of the material guiding component 3, thereby avoiding the position of the material guiding component 3 from deviating from a predetermined position and affecting the accuracy of the material guiding component 3 for feeding material.

The flattening device of the present application guides the sheet material 98 to move in the extending direction of the flattening channel 99. The flattening device may reshape the sheet material 98, so that the sheet material 98 passing through the flattening channel 99 will be approximately kept in a horizontal position and thus can rapidly and accurately enter a predetermined processing position of the next procedure, thereby ensuring the operating continuity of the production line and thus improving the production efficiency of the production line. During the production, the operator only needs to pull the sheet material 98 into the flattening channel 99, and then a pushing force is applied to the sheet material 98 (for example, an uncoiler actively applies a pushing force to the sheet material 98) to drive the sheet material 98 to move in the flattening channel 99, thereby reducing the labor intensity and danger of the loading operation of the sheet material 98. The material pressing portion 21 and the material guiding portion 31 can restrict and limit the sheet material 98 in position, avoid the sheet material 98 from being jammed due to the position deviation of the sheet material 98 during movement in the flattening channel 99, and thus can ensure the smoothness and stability of the movement of the sheet material 98.

The material guiding portion 31 and the material pressing portion 21 of the present embodiment are formed into arc surfaces with shapes adapted to each other. The flattening channel 99 formed by the material guiding portion 31 and the material pressing portion 21 is arc-shaped. The arc-shaped flattening channel 99 can perform a pre-stress relief treatment on the sheet material 98 to eliminate possible bending stress in the sheet material 98 itself, so that the sheet material 98 finally passing through an exit of the flattening channel 99 can be maintained in the horizontal position more easily, and will not be bent under the action of the bending stress in itself, thereby advantageously ensuring that the sheet material 98 passing through the exit of the flattening channel 99 can enter the processing station of the next procedure more accurately. The arc-shaped flattening channel 99 can change the moving direction of the sheet material 98. The sheet material 98 can enter the inside of the arc-shaped flattening channel 99 through an entrance of the arc-shaped flattening channel 99 from different directions, while the sheet materials 98 that pass through the exit of the flattening channel 99 are substantially kept in one direction, and the moving direction of the sheet material 98 after passing through the flattening channel 99 is different from the moving direction of the sheet material 98 before entering the flattening channel 99, which can improve the adaptability of the flattening device. When the sheet material 98 is coiled, the uncoiled sheet material 98 itself is curved. The arc-shaped flattening channel 99 can adapt to the curved sheet material 98, and thus the curved sheet material 98 can be inserted into the are-shaped flattening channel 99 conveniently and effortlessly, without the need of flattening the curved sheet material 98 in advance, which reduces the processing procedures and improves the efficiency of the feeding operation. In addition, the uncoiled sheet material 98 will abut on the material pressing portion 21 under the action of an elastic force in itself, and the end of the sheet material 98 will be restricted and positioned by the material pressing portion 21, which facilitates the loading of the sheet material 98 into the flattening channel 99.

Two ends of the material guiding portion 31 in the extending direction of the flattening channel 99 of the present embodiment are formed to have flat surfaces, that is, the surface of the end of the material guiding portion 31 located at the entrance of the flattening channel 99 and facing the end of the material pressing component 2 is flat, and the surface of the end of the material guiding portion 31 located at the exit of the flattening channel 99 and facing the material pressing component 2 is also flat. In one embodiment, an intermediate surface between the two ends of the material guiding portion 31 may be an arc surface or a flat surface. In the case that the intermediate surface of the material guiding portion 31 is an arc surface, the flat surfaces at the two ends of the material guiding portion 31 are tangent to the arc surface, so that the material guiding portion 31 is transitioned smoothly, ensuring that the end of the sheet material 98 will not be jammed easily when moving immediately adjacent the material guiding portion 31, and improving the smoothness and stability of the movement of the sheet material 98. In the case that the intermediate surface of the material guiding portion 31 is a flat surface, the angles between this flat surface and the flat surfaces at the two ends of the material guiding portion 31 are equal and obtuse, to facilitate the movement of the sheet material 98 in the flattening channel 99.

Figure 2:
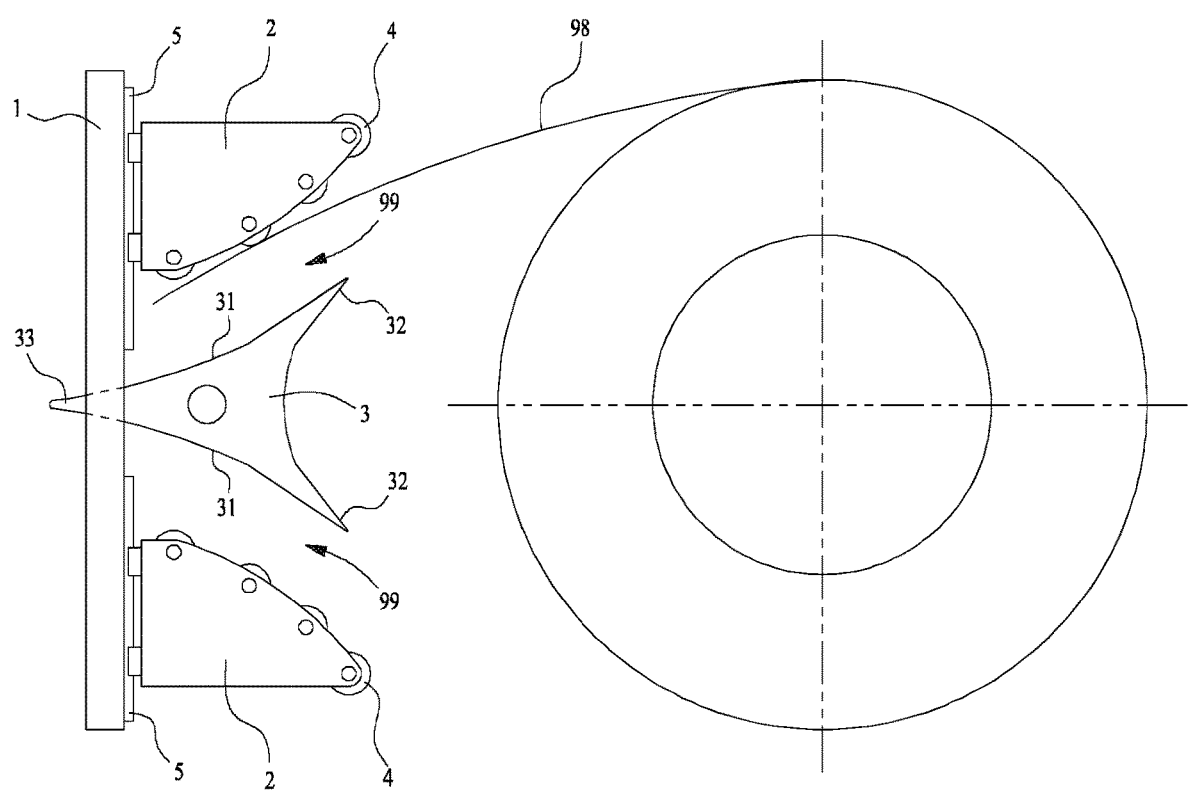
FIG. 2 is a schematic diagram of a flattening device according to another embodiment of the present application in a use state.
Figure 3:
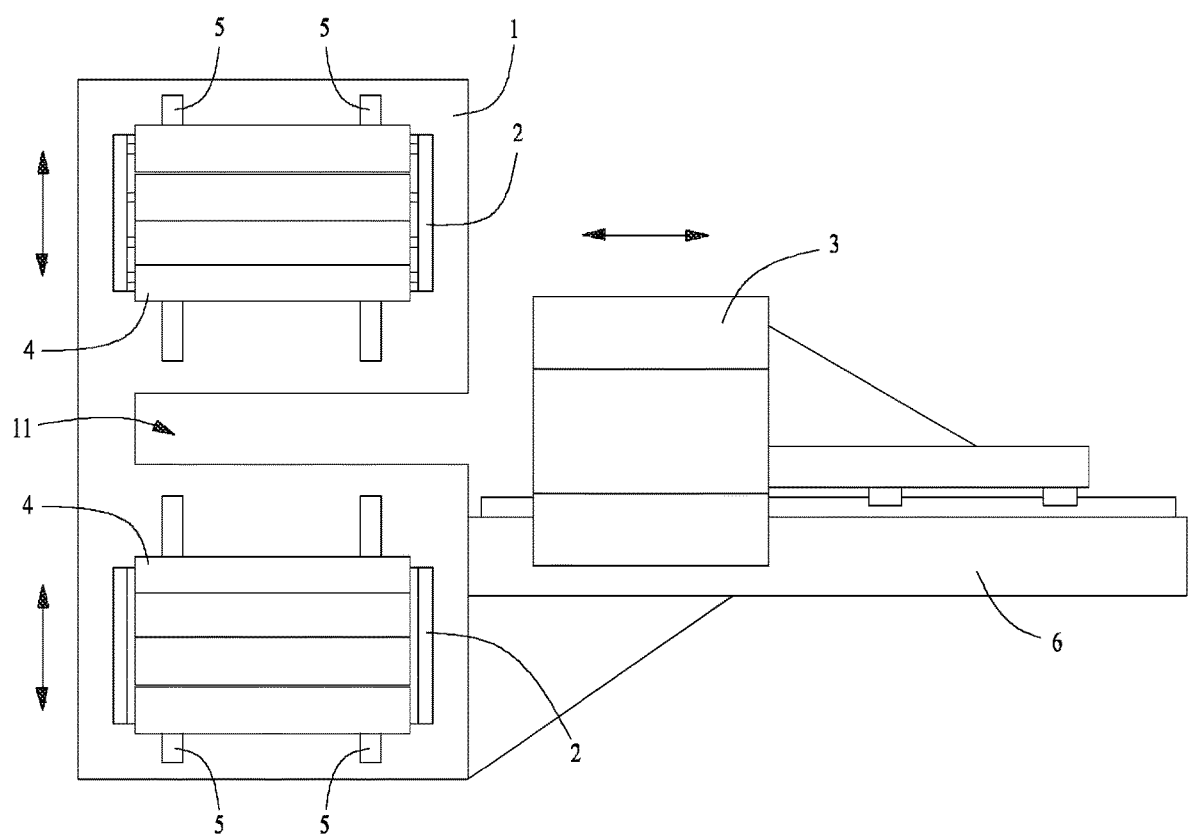
FIG. 3 is a schematic structural side view of the flattening device of the embodiment of FIG. 2.
Figure 4:
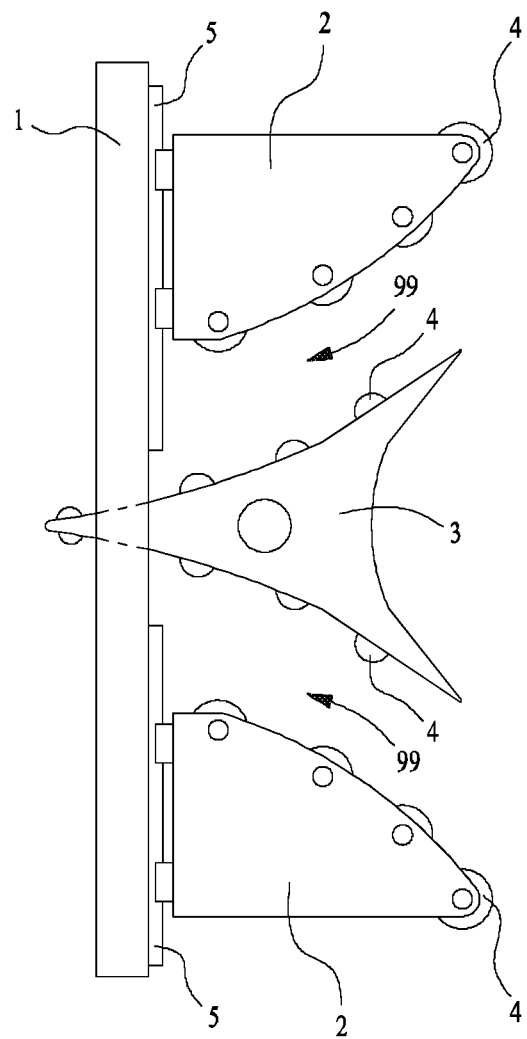
FIG. 4 is a schematic structural diagram of a flattening device according to a further embodiment of the present application.

As shown in FIG. 2, FIG. 3, or FIG. 4, at least one of the material guiding portion 31 and the material pressing portion 21 of the present embodiment includes a plurality of rotating components 4. The plurality of rotating components 4 are arranged in the extending direction of the flattening channel 99. When the sheet material 98 moves in the flattening channel 99, the rotating components 4 will be driven to rotate in the moving direction of the sheet material 98. Thus, the resistance on the sheet material 98 during the movement can be reduced by the rotating components 4 arranged on the material guiding portion 31 and/or the material pressing portion 21, thereby ensuring the smoothness and stability of the movement of the sheet material 98, and meanwhile, the pushing force applied to the sheet material 98 also can be reduced, thereby reducing the energy consumption. In one embodiment, the material pressing portion 21 is provided with a plurality of rotating components 4. The material pressing component 2 includes two supporting plates arranged in parallel. Each supporting plate is provided with a plurality of mounting holes arranged in the extending direction of the flattening channel 99 on a side facing the material guiding component 3. The rotating component 4 is installed in the mounting hole with a rotating shaft coincident with a center line of the mounting hole. Further, the material pressing component 2 includes a cover plate. The cover plate is connected with the two parallel supporting plates to cover the gap between the two supporting plates while with an opening left on the side of the material pressing component 2 facing the material guiding component 3. The cover plate and the two parallel support plates form a box with an opening after being connected, and the rotating component 4 is disposed in the opening, with a portion located within the box and another portion extending out of the opening. The material pressing component 2 consisting of the cover plate and the supporting plates can prevent dust or other sundries from falling on the rotating component 4 and affecting the normal rotation of the rotating component 4. In a preferred embodiment, each of the material guiding portion 31 and the material pressing portion 21 is provided with a plurality of rotating components 4, to effectively reduce the resistance on the sheet material 98 during the movement thereof. In this case, the plurality of rotating components 4 provided on the material guiding portion 31 and the material pressing portion 21 are arranged to form an arc-shaped flattening channel 99.

Further, each of the plurality of rotating components 4 is formed in a cylindrical shape and rotation axes of the plurality of rotating components 4 are parallel to each other. The plurality of rotating components 4 are arranged in sequence in the extending direction of the flattening channel 99. In the case that the end of the sheet material 98 is formed in an irregular shape, the cylindrical rotating components 4 also can adapt to such sheet material 98, and thus the end of the sheet material 98 can be avoided from being caught between adjacent rotating components 4. The rotation axes of the plurality of rotating components 4 parallel to each other can ensure the consistency of the rotation direction and force direction of the rotating components 4, and effectively reduce the resistance on the sheet material 98 during movement thereof. The rotating components 4 of the present embodiment are formed as rollers or roller wheels.

The adjustment component of the present embodiment includes a guiding member. The material pressing component 2 is movably disposed on the machine framing 1 through the guiding member. When the material pressing component 2 moves on the machine framing 1, the material pressing portion 21 is made vertically close to or away from the material guiding portion 31 so as to adjust the distance between the material pressing portion 21 and the material guiding portion 31 conveniently. After the sheet material 98 is loaded into the flattening channel 99, the position of the material pressing component 2 is adjusted so that the material pressing portion 21 moves close to the sheet material 98 and finally abuts against the sheet material 98; as a result, the material pressing portion 21 and the material guiding portion 31 abut against two sides of the sheet material 98 respectively, and the movement space of the sheet material 98 in the flattening channel 99 is reduced to limit and restrict the sheet material 98 in position, which is beneficial for the sheet material 98 to move toward the exit of the flattening channel 99 and ensures the moving stability of the sheet material 98. The movable material pressing component 2 makes the loading operation of the sheet material 98 easier and more labor-saving, and improves the efficiency of the loading operation of the sheet material 98. In one embodiment, the guiding member includes a linear guide rail 5 disposed on the machine framing 1 and a linear dovetail groove (not shown in the figure) disposed on the material pressing component 2. The linear guide rail 5 extends vertically, and can guide the material pressing component 2 to move vertically, so that the material pressing portion 21 moves close to or away from the material guiding portion 31. Further, the adjustment component of the present embodiment includes a driving mechanism (not shown in the figure) adapted to drive the material pressing component 2 to move, such as a hydraulic cylinder or an electric cylinder.

The flattening device of the present embodiment further includes a moving component. The moving component is adapted to drive the material guiding component 3 to move, so that the material guiding portion 31 and the pressing portion 21 can be aligned or staggered transversally. "Transversally" here refers to a direction perpendicular to the above-mentioned vertical direction. When the sheet material needs to be loaded, the moving component drives the material guiding portion 31 to move transversally, to stagger the material guiding portion 31 and the material pressing portion 21 and give a way to the sheet material 98, thereby avoiding the movement interference and facilitating the end of the sheet material 98 to abut on the material pressing portion 21. After the end of the sheet material 98 abuts on the material pressing portion 21, the moving component drives the material guiding portion 31 to move transversally, to align the material guiding portion 31 and the material pressing portion 21 and form the flattening channel 99. In this case, the sheet material 98 is located in the flattening channel 99. Then, a pushing force is applied to the sheet material 98 (for example, an uncoiler actively applies a pushing force to the sheet material 98) to move it in the extending direction of the flattening channel 99. The flattening device provided with the moving component makes the loading of the sheet material 98 simpler and easier to operate, which improves the loading efficiency of the sheet material 98, and also prevents the end of the sheet material 98 from hitting the material guiding component 3 and thus damaging the material guiding component 3. In one embodiment, as shown in FIG. 3, the moving component includes a slide rail 6 connected with the machine framing 1, a dovetail groove disposed on the material guiding component 3 and slidably matched with the slide rail 6, and a driving mechanism (not shown in the figure). The driving mechanism is adapted to drive the material guiding component 3 to move in an extending direction of the slide rail 6 so that the material guiding component 3 and the material pressing component 2 can be transversally aligned or staggered. The driving mechanism of the present embodiment may be a hydraulic cylinder or an electric cylinder.

As shown in FIG. 1 and FIG. 2, the material guiding component 3 of the present embodiment includes a cutting end 32 extending toward the entrance of the flattening channel 99. The cutting end 32 is adapted to cut the material. The cutting end 32 extends beyond the end of the material pressing component 2 at the entrance of the flattening channel 99, so that the cutting end 32 is closer to the material to be cut, thereby avoiding the positional interference between the end of the material pressing component 2 and the cutting end 32, which will cause the cutting end 32 not be able to touch the material to be cut. For example, when the sheet material 98 is in a coiled shape, the end of the sheet material 98 is in a welded state. When it is necessary to uncoil the coiled sheet material 98, the cutting end 32 of the material guiding component 3 can cut the welded joint of the end of the sheet material 98 conveniently and quickly, to release the end of the sheet material 98. The material guiding component 3 provided with the cutting end 32 improves the automation degree of the flattening device, and does not need manpower to uncoil the coiled sheet material 98 using auxiliary tools, and thus can improve the operating efficiency of the entire production line. The cutting end 32 of the present embodiment is formed in a shape of long strip with a sharp edge and extending in the transverse direction.

The material guiding component 3 of the present embodiment further includes a guiding end 33 extending toward the exit of the flattening channel 99. The guiding end 33 extends beyond the end of the material pressing component 2 at the exit of the flattening channel 99. The surface of the guiding end 33 facing the material pressing portion 21 is a flat surface. In such manner, the guiding end 33 can guide the sheet material 98 passing through the exit of the flattening channel 99, so that the sheet material 98 passing through the exit of the flattening channel 99 is maintained approximately in the horizontal position, which is beneficial to improve the positional accuracy of the sheet material 98 entering the processing station of the next procedure. The guiding end 33 and the cutting end 32 of the present embodiment are disposed opposite to each other, and are respectively disposed at two ends of the material guiding portion 31. In one embodiment, as shown in FIG. 3, the machine framing 1 is provided with a slot 11, the guiding end 33 can move into or out of the slot 11, and the guiding end 33 extends through the slot.

Figure 8:
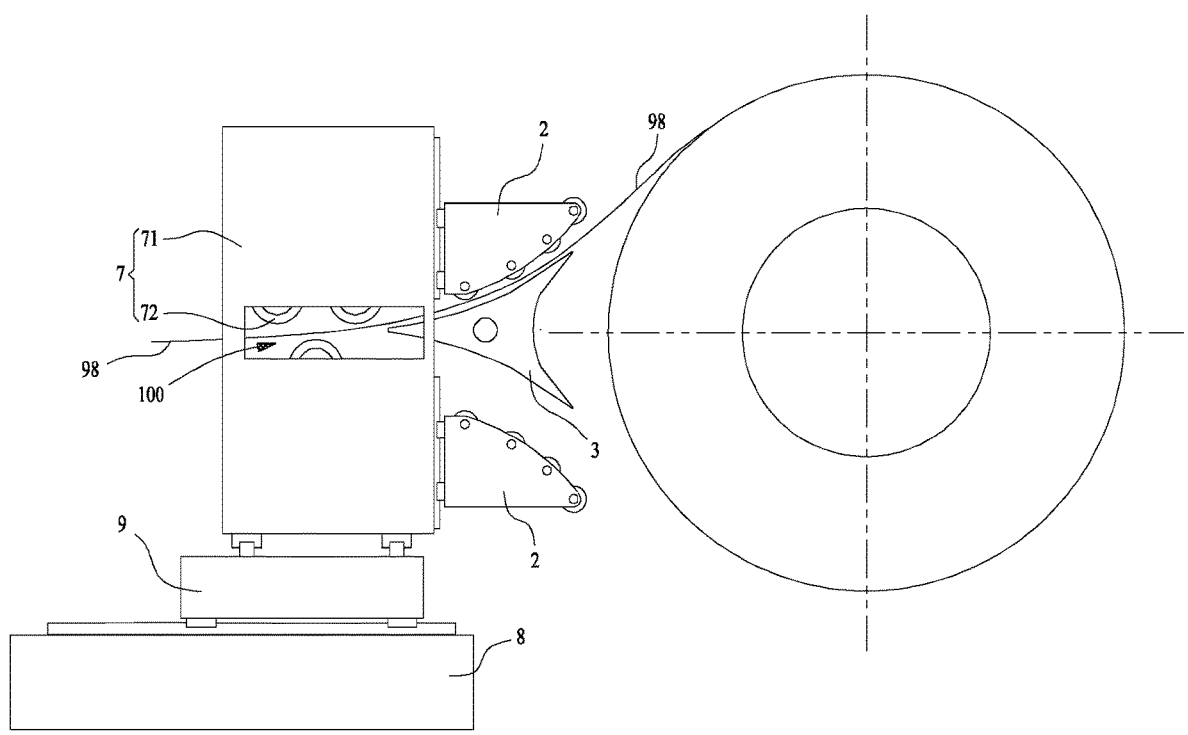
FIG. 8 is a schematic diagram of the conveying apparatus according to an embodiment of the present application in a use state of feeding material in an upper feeding manner.
Figure 10:
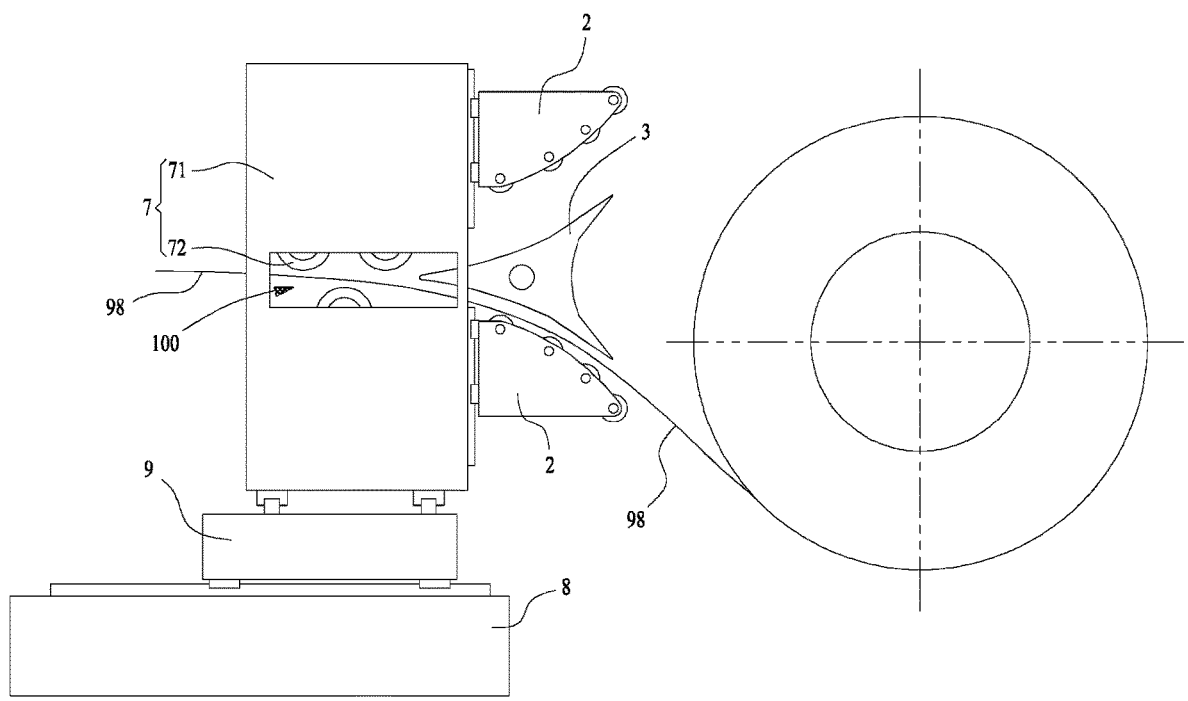
FIG. 10 is a schematic diagram of the conveying apparatus according to an embodiment of the present application in a use state of feeding material in a lower feeding manner.
Figure 11:
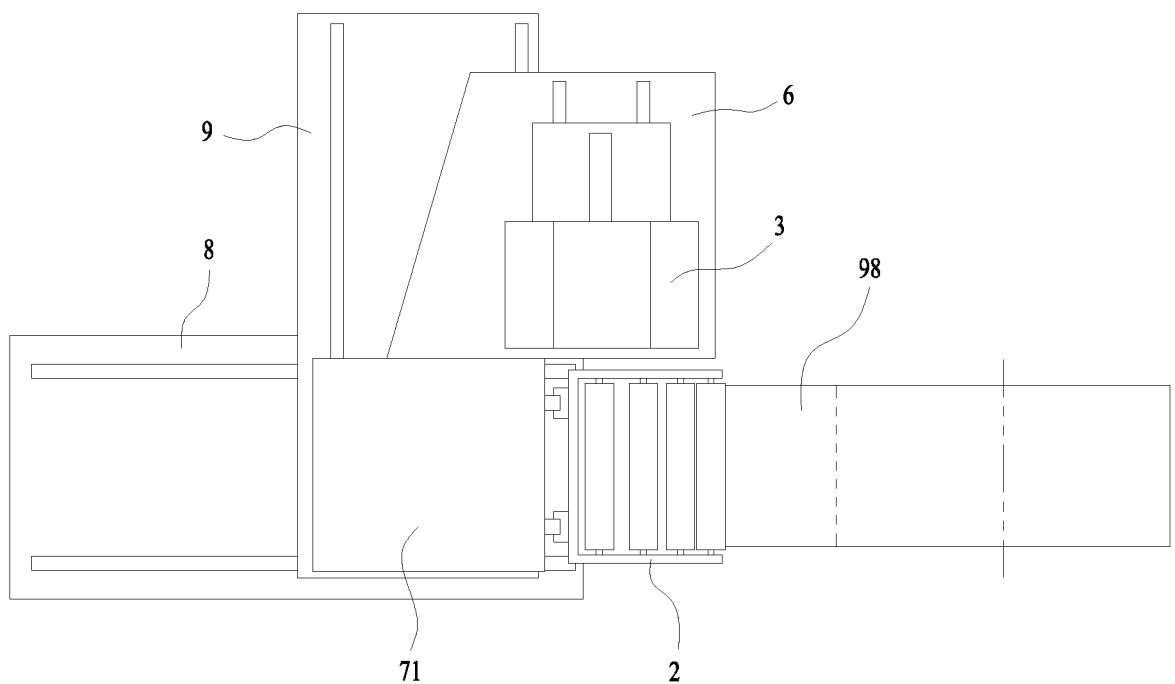
FIG. 11 is a schematic top view of a structure of a conveying apparatus according to an embodiment of the present disclosure when the sheet material is fed.

In one embodiment, as shown in FIG. 1, the flattening device includes two material pressing components 2, and the two material pressing components 2 are disposed on two sides of the material guiding component 3 in the vertical direction. Each of the two material pressing components 2 forms a flattening channel 99 with the material guiding component 3. The two flattening channels 99 are disposed at intervals in the vertical direction. In such manner, it is convenient for the sheet material 98 to be loaded into one of the two flattening channels 99 according to the incoming direction of the sheet material 98 during the actual production. As shown in FIG. 8, in the case that the sheet material 98 comes from an upper position, the sheet material 98 is loaded into the upper flattening channel 99, and is restricted and limited in position by the upper material pressing component 2 and the material guiding component 3. As shown in FIG. 10, in the case that the sheet material 98 comes from a lower position, the sheet material 98 is loaded into the lower flattening channel 99, and is restricted and limited in position by the lower material pressing component 2 and the material guiding component 3. The flattening device provided with two material pressing components 2 can receive the sheet materials 98 with different incoming directions, and reshape and guide the sheet materials 98 by corresponding flattening channels 99, which can improve the adaptability and operating efficiency of the flattening device itself. The material guiding component 3 of the present embodiment includes a guiding end 33 and two cutting ends 32. The two cutting ends 32 are spaced apart in the vertical direction. The guiding end 33 is disposed opposite to the two cutting ends 32, and is approximately located at a middle position between the two cutting ends 32, so that the connection lines between the position of the guiding end 33 and the positions of the two cutting ends 32 substantially form a triangle.

In the flattening device of the embodiments of the present application, the sheet material 98 is reshaped and guided through the flattening channel 99 formed between the material pressing component 2 and the material guiding component 3. The operator can load the sheet material 98 into the flattening channel 99 conveniently, labor-saving and fast. After the sheet material 98 is loaded into the flattening channel 99, the material pressing portion 2 and the material guiding component 3 can cooperate to guide the sheet material 98, so that the sheet material 98 can enter the processing station of the next procedure stably, rapidly and accurately. The flattening device of the embodiment of the present application improves the operating efficiency of the feeding of the sheet material 98, and reduces the difficulty of the feeding of the sheet material 98.

As shown in FIGS. 5 to 11, the embodiment of the present application also relates to a conveying apparatus for conveying the sheet material 98. The conveying apparatus of the present embodiment includes a material guiding device 7 and the above-mentioned flattening device. The material guiding device 7 is disposed downstream of the flattening device, so that the sheet material 98 enters the material guiding device 7 after passing through the flattening channel 99 of the flattening device. The material guiding device 7 can convey the sheet material 98 to the processing station of the next procedure. The material guiding device 7 of the present embodiment includes a conveying channel 100 extending in the horizontal direction. The exit of the flattening channel 99 is substantially aligned with an entrance of the conveying channel 100 so that the flattening channel 99 is communicated with the conveying channel 100. The sheet material 98 passes through the exit of the flattening channel 99 and moves in the horizontal direction to enter the conveying channel 100 through the entrance of the conveying channel 100.

Figure 5:
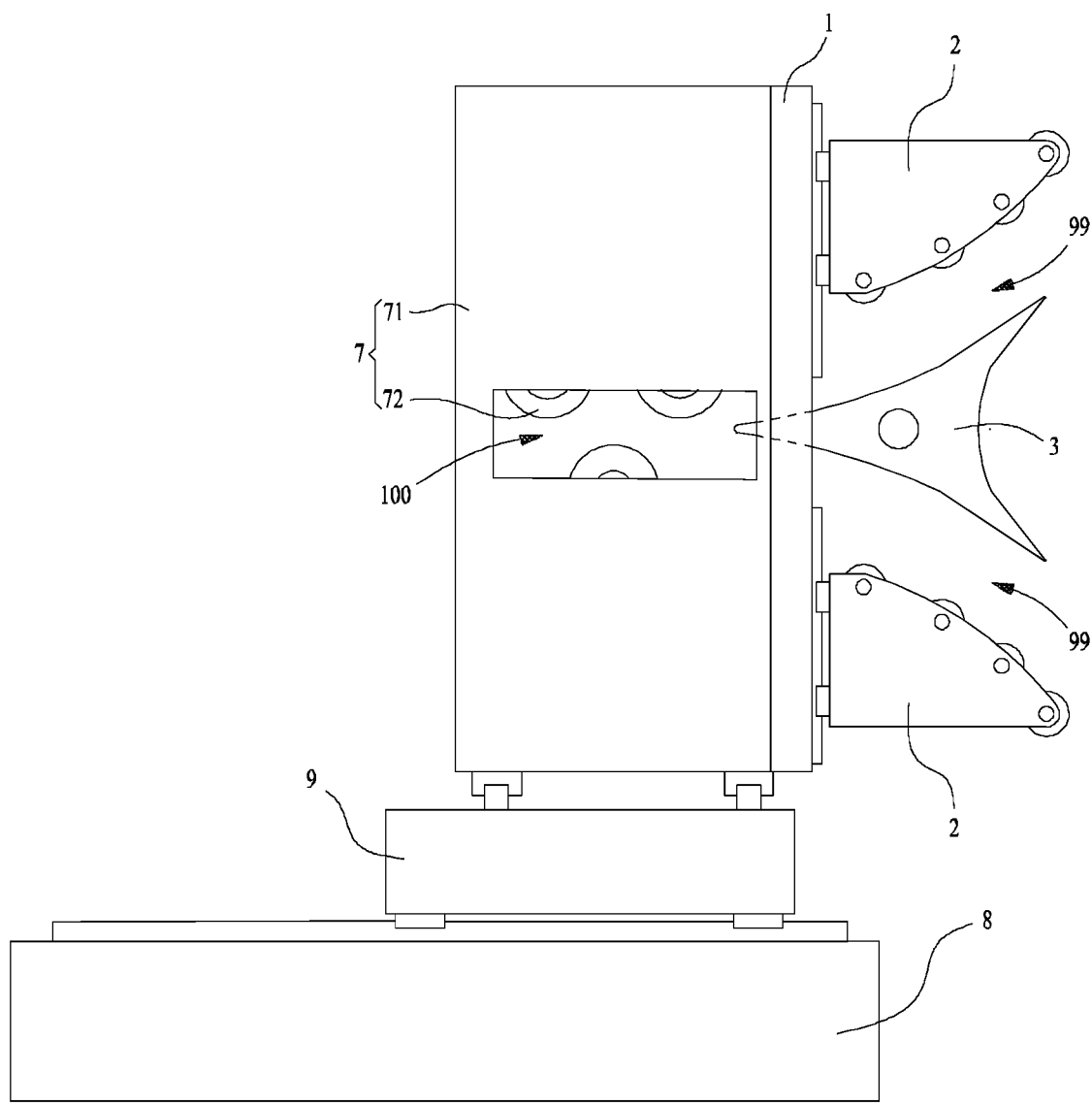
FIG. 5 is a schematic diagram of an overall structure of a conveying apparatus according to an embodiment of the present application.

As shown in FIG. 5, the material guiding device 7 of the present embodiment includes a housing 71 and two rows of guide rollers 72 disposed within the housing 71. The two rows of guide rollers 72 are spaced apart in the vertical direction to form the conveying channel 100. The material guiding device 7 of the present embodiment can be installed and fixed to a working platform (for example, the ground or a surface of a device) through the housing 71. The guide roller 72 is configured as a driving roller and is driven to rotate by a driving mechanism. After the sheet material 98 enters the conveying channel 100, the two rows of guide rollers 72 respectively press against two sides of the sheet material 98 and actively apply traction forces to the sheet material 98, so that the sheet material 98 moves in an extending direction of the conveying channel 100 and finally passes through the conveying channel 100. The guide rollers 72 of the present embodiment are cylindrical, and the rotation axes of the guide rollers 72 in each row are parallel to each other. In one embodiment, the guiding end 33 of the material guiding component 3 extends into the conveying channel 100. The guiding end 33 of the material guiding component 3 is disposed close to the guiding rollers 72 near the entrance of the conveying channel 100 among all the guiding rollers 72, to shorten the distance between the guiding end 33 and the guiding rollers 7, ensure an earlier contact of the sheet material 98 with the guide rollers 72, and also avoid the situation that the end of the sheet material 98 sags under its own gravity, hits the guide roller 72 and thus cannot normally enter the gap between the two rows of guide rollers 72, which is beneficial to improve the smoothness and stability of the sheet material 98 during movement.

Figure 6:
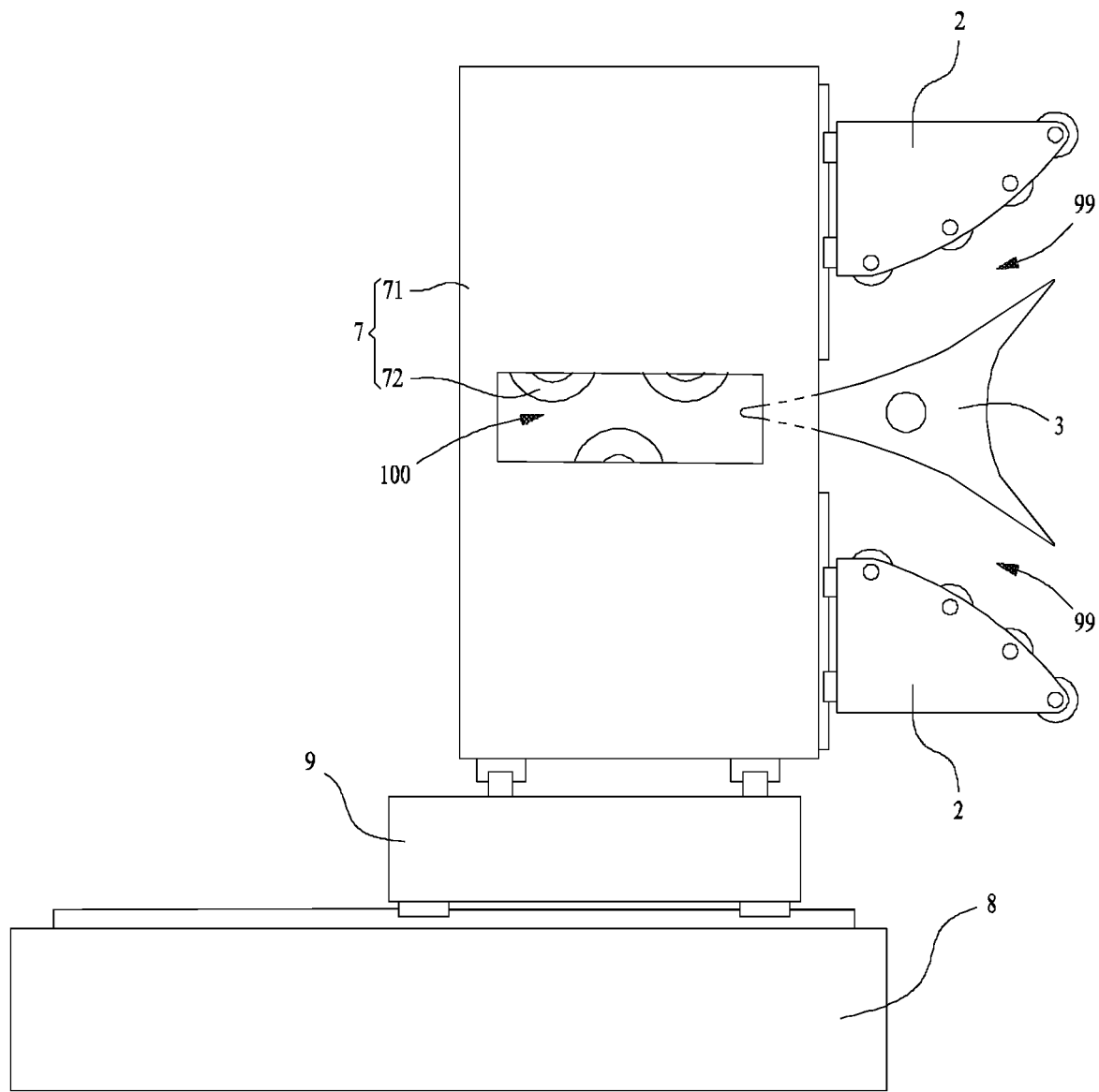
FIG. 6 is a schematic diagram of an overall structure of a conveying apparatus according to another embodiment of the present application.

In one embodiment, the machine framing 1 of the flattening device and the material guiding device 7 are integrally formed or detachably connected. As shown in FIG. 6, in the case that the machine framing 1 of the flattening device and the material guiding device 7 are integrally formed, the machine framing 1 and the housing 71 of the material guiding device 7 are integrally formed. In this case, the material pressing component 2 is movably disposed on an outer wall of the housing 71 via a guiding member. The guiding member of the present embodiment includes a linear guide rail 5 disposed on the outer wall of the housing 71 and a linear dovetail groove disposed on the material pressing component 2. The linear guide rail 5 extends vertically, and the material pressing component 2 can move vertically. Further, the conveying apparatus includes a driving mechanism (not shown in the figure) adapted to drive the material pressing component 2 to move, such as a hydraulic cylinder and an electric cylinder. The moving component of the present embodiment is connected to the housing 71. As shown in FIG. 5, in the case that the machine framing 1 of the flattening device and the material guiding device 7 are detachably connected, the machine framing 1 can be fixedly connected to the housing 71 by screws or bolts. When the flattening device needs to be maintained or repaired, the machine framing 1 can be easily and quickly removed from the housing 71, and the flattening device can be removed entirely for maintenance or repair.

In an embodiment, as shown in FIGS. 5 to 11, the conveying apparatus further includes a first guide rail 8. The material guiding device 7 is movably disposed on the first guide rail 8. The material guiding device 7 is supported on a working platform (for example, the ground or a surface of a device) through the first guide rail 8. The material guiding device 7 can move in a first horizontal direction on the first guide rail 8 so that the flattening device connected with the material guiding device 7 moves close to or away from the sheet material 98. When the sheet material 98 is located in a different position, the material guiding device 7 can be adjusted in position in the first horizontal direction to facilitate the loading of the sheet material 98 into the flattening channel 99, which improves the flexibility and adaptability of the conveying apparatus.

In an embodiment, as shown in FIGS. 5 to 11, the conveying apparatus further includes a second guide rail 9. The second guide rail 9 is movably disposed on the above-mentioned first guide rail 8. The material guiding device 7 is movably connected to the second guide rail 9. The material guiding device 7 can move in a second horizontal direction on the second guide rail 9, wherein the second horizontal direction is perpendicular to the first horizontal direction. The second guide rail 9 increase a degree of freedom of movement for the material guiding device 7. The material guiding device 7 can enter or exit from the production line by means of movement on the second guide rail 9. Thus, it is convenient to rapidly adjust the position of the material guiding device 7 according to the requirements of the production line to process products, the operational flexibility and adaptability of the conveying apparatus are further improved, and thus the flexibility, processing capacity and adaptability of the entire production line are improved.

In order to further explain the conveying apparatus of the present embodiment, the conveying apparatus of the present embodiment will be described combined with FIGS. 7 to 10. The present embodiment lies in the process of conveying the coiled sheet material 98 by use of the conveying apparatus according to the embodiments of the present application, wherein the flattening device includes two material pressing components 2. The machine framing 1 of the flattening device and the material guiding device 7 are integrally formed.

The present embodiment does not define the protection scope of the present application, and is described as below.

The conveying apparatus of the present embodiment is adapted to convey a coiled sheet material 98. The conveying apparatus of the present embodiment includes a first guide rail 8, a second guide rail 9, a material guiding device 7, and a material pressing component 2 and a material guiding component 3 disposed on the material guiding device 7.

Figure 7:
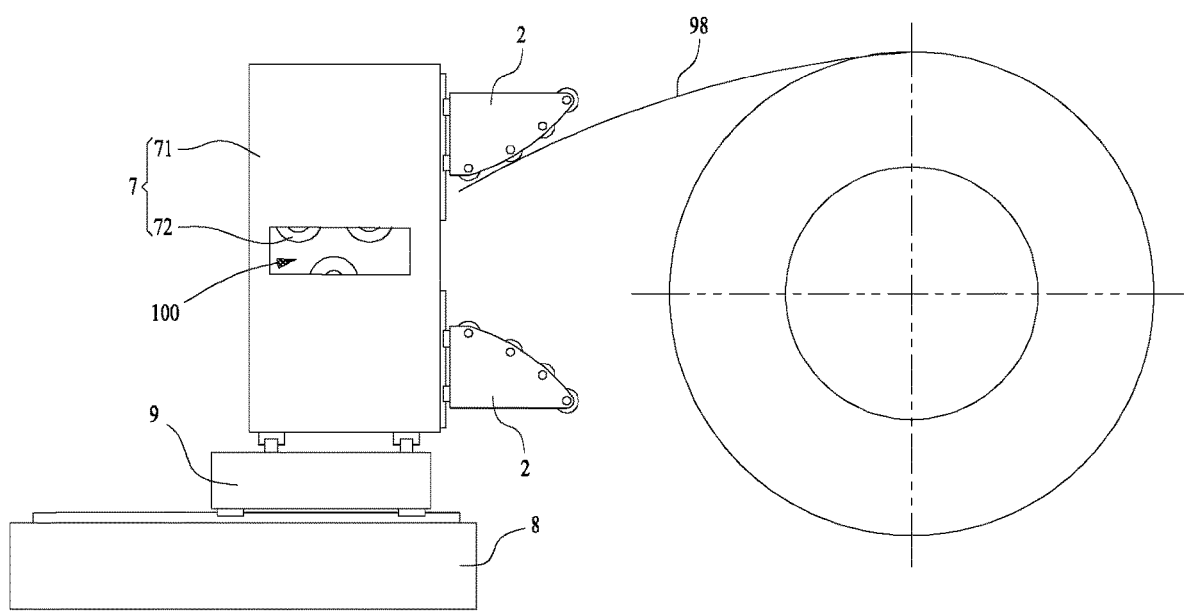
FIG. 7 is a schematic diagram of the conveying apparatus according to an embodiment of the present application in a use state of feeding material in an upper feeding manner.

As shown in FIGS. 7 and 8, after the coiled sheet material 98 is uncoiled, the end of the sheet material 98 enters the conveying apparatus in an upper feeding manner. For feeding of the sheet material 98 in the upper feeding manner, the operating process of the conveying apparatus includes the following operations:

keeping the coiled sheet material 98 in a coiled state, and driving the material guiding component 3 to move transversally to stagger the material guiding portion 31 of the material guiding component 3 and the material pressing portion 21 of the material pressing component 2;

moving the material guiding device 7 to a suitable position along the first guide rail 8 and the second guide rail 9, and then uncoiling the coiled sheet material 98, wherein the end of the sheet material 98 is subjected to the elastic stress in itself and will abut on the material pressing portion 21 of the upper material pressing component 2;

driving the material guiding component 3 to move transversally, to align the material guiding portion 31 of the material guiding component 3 and the material pressing portion 21 of the material pressing component 2;

driving the material pressing component 2 to move vertically so that the material pressing portion 21 of the material pressing component 2 is continuously close to the sheet material 98 and finally abuts against two sides of the sheet material 98 together with the material guiding portion 31 to sandwich the sheet material 98 between the material pressing portion 21 and the material guiding portion 31;

starting the guide rollers 72 of the material guiding device 7, and then starting the uncoiler. When the uncoiler rotates, the uncoiler drives the sheet material 98 to move in the extending direction of the flattening channel 99. The sheet material 98 that has been reshaped and guided by the material guiding portion 31 and the material pressing portion 21 passes through the flattening channel 99 and enters the conveying channel 100, then passes through the exit of the conveying channel 100 under the traction of the guide rollers 72, and finally enters the subsequent production line; and stopping the conveying apparatus when one coil of sheet material 98 is completely conveyed, reloading one coil of sheet material 98 onto the uncoiler, and repeating the above-mentioned operating process.

Figure 9:
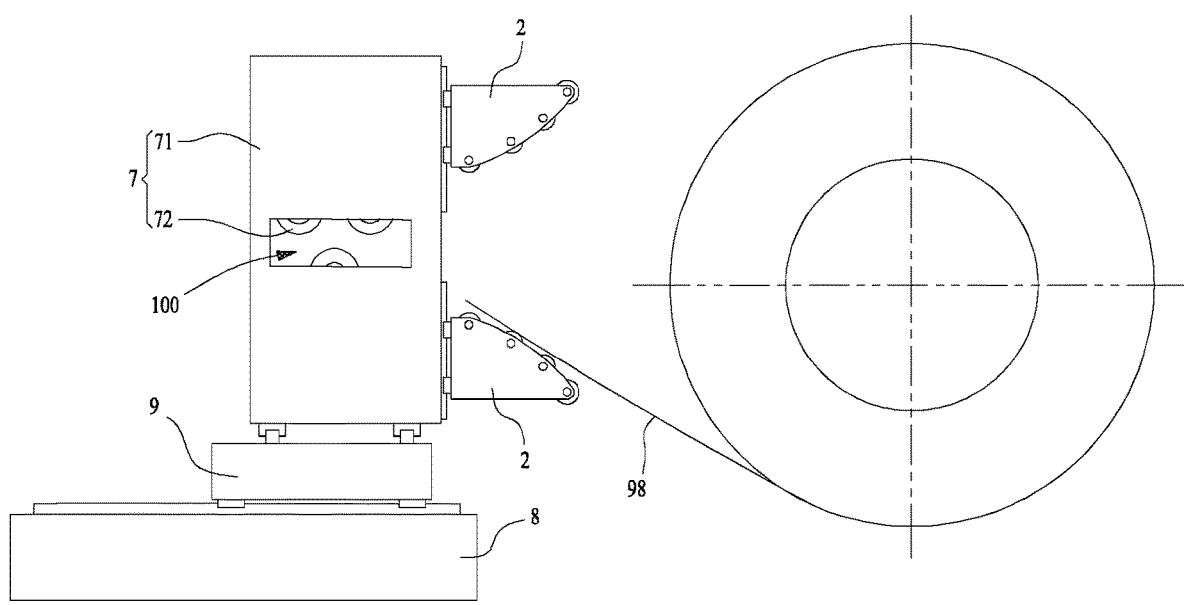
FIG. 9 is a schematic diagram of the conveying apparatus according to an embodiment of the present application in a use state of feeding material in a lower feeding manner.

As shown in FIGS. 9 and 10, after the coiled sheet material 98 is uncoiled, the end of the sheet material 98 enters the conveying apparatus in a lower feeding manner. For feeding of the sheet material 98 in the lower feeding manner, the same portion of the operating process of the conveying apparatus as that of the conveying apparatus under the upper feeding manner, will not be repeated here. The difference lies in that the sheet material 98 after uncoiled abuts on the material pressing portion 21 of the lower material pressing component 2, and the lower material pressing component 2 moves vertically and cooperates with the material guiding component 3 to reshape and guide the sheet material 98.

The conveying apparatus of the embodiments of the present application can guide, reshape, and convey the sheet material 98 sequentially through the flattening device and the material guiding device 7, so as to ensure the continuity and efficiency of the supply of the sheet material 98 on the production line, and also reduce the difficulty of the operating process from feeding to conveying of the sheet material 98; thus, the automation degree of the production line is improved, manpower and material resources are saved, and the production efficiency is advantageously improved.

The embodiment of the present application further relates to a processing system for processing the sheet material 98, wherein the processing system includes the above-mentioned conveying apparatus. The conveying apparatus included in the processing system can substantially maintain a continuous supply of the sheet material 98, with a high efficiency of loading the sheet material 98, and thus the overall production efficiency of the processing system is high, and the processing cost is reduced.

Although the present application has been described with reference to the preferred embodiments, various improvements can be made to the present application and the components therein can be replaced with equivalents, without departing from the scope of the present application. In particular, as long as there is no structural conflict, the various technical features mentioned in the various embodiments can be combined in any manner. The present application is not limited to the specific embodiments disclosed in the context, but includes all technical solutions falling within the scope of the claims.

What is claimed is:

1. A flattening device for sheet material, comprising:
   a machine framing;
   a material pressing component, disposed on the machine framing and comprising a material pressing portion;
   a material guiding component, disposed on the machine framing and comprising a material guiding portion corresponding to the material pressing portion, the material pressing portion and the material guiding portion being arranged to be able to abut against two sides of the sheet material respectively and form a flattening channel between the material guiding portion and the material pressing portion; and
   an adjustment component, adapted to drive at least one of the material pressing component and the material guiding component to move, so as to adjust a distance between the material guiding portion and the material pressing portion,
   wherein the adjustment component comprises a guiding member, and the material pressing component is movably disposed on the machine framing via the guiding member so that the material pressing portion is able to vertically move close to or away from the material guiding portion, and
   the flattening device further comprises a moving component adapted to drive the material guiding component to move so that the material guiding portion and the material pressing portion are transversally aligned or staggered.

2. The flattening device according to claim 1, wherein the material guiding portion and the material pressing portion are formed into arc surfaces with shapes adapted to each other.

3. The flattening device according to claim 2, wherein two ends of the material guiding portion in an extending direction of the flattening channel are formed to have flat surfaces.

4. The flattening device according to claim 1, wherein at least one of the material guiding portion and the material pressing portion comprises a plurality of rotating components arranged in an extending direction of the flattening channel.

5. The flattening device according to claim 4, wherein each of the plurality of rotating components is formed in a cylindrical shape, and rotation axes of the plurality of rotating components are parallel to each other.

6. The flattening device according to claim 1, wherein the material guiding component comprises a cutting end extending toward an entrance of the flattening channel, and the cutting end extends beyond an end of the material pressing component located at the entrance of the flattening channel.

7. The flattening device according to claim 1, wherein the material guiding component comprises a guiding end extending toward an exit of the flattening channel, and the guiding end extends beyond an end of the material pressing component located at the exit of the flattening channel.

8. The flattening device according to claim 1, wherein the flattening device comprises two material pressing components vertically disposed on two sides of the material guiding component.

9. A conveying apparatus for conveying sheet material, comprising:
   the flattening device according to claim 1; and
   a material guiding device, disposed downstream of the flattening device so that the sheet material enters the material guiding device by means of the flattening channel of the flattening device.

10. The conveying apparatus according to claim 9, wherein the machine framing of the flattening device is integrally formed or detachably connected with the material guiding device.

11. The conveying apparatus according to claim 10, further comprising a first guide rail, the material guiding device is movably disposed on the first guide rail, and is able to move in a first horizontal direction on the first guide rail so as to move the flattening device close to or away from the sheet material.

12. The conveying apparatus according to claim 11, further comprising a second guide rail movably disposed on the first guide rail, and the material guiding device is movably connected to the second guide rail, and is able to move in a second horizontal direction on the second guide rail, wherein the first horizontal direction is perpendicular to the second horizontal direction.

13. A processing system for processing sheet material, wherein the processing system comprises the conveying apparatus according to claim 9.

14. The flattening device according to claim 2, wherein the flattening device comprises two material pressing components vertically disposed on two sides of the material guiding component.

15. The flattening device according to claim 6, wherein the flattening device comprises two material pressing components vertically disposed on two sides of the material guiding component.

16. The flattening device according to claim 7, wherein the flattening device comprises two material pressing components vertically disposed on two sides of the material guiding component.

\* \* \* \* \*